W. B. HAINES.
MEASURING PUMP.
APPLICATION FILED JUNE 9, 1908.
958,919.
Patented May 24, 1910.
2 SHEETS—SHEET 1.
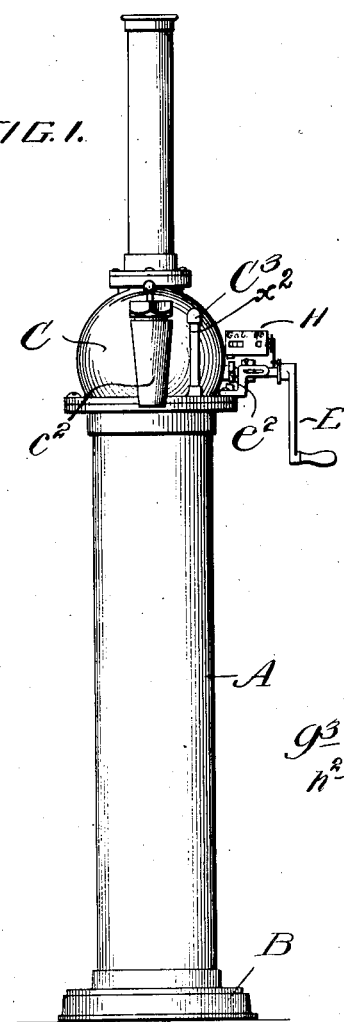
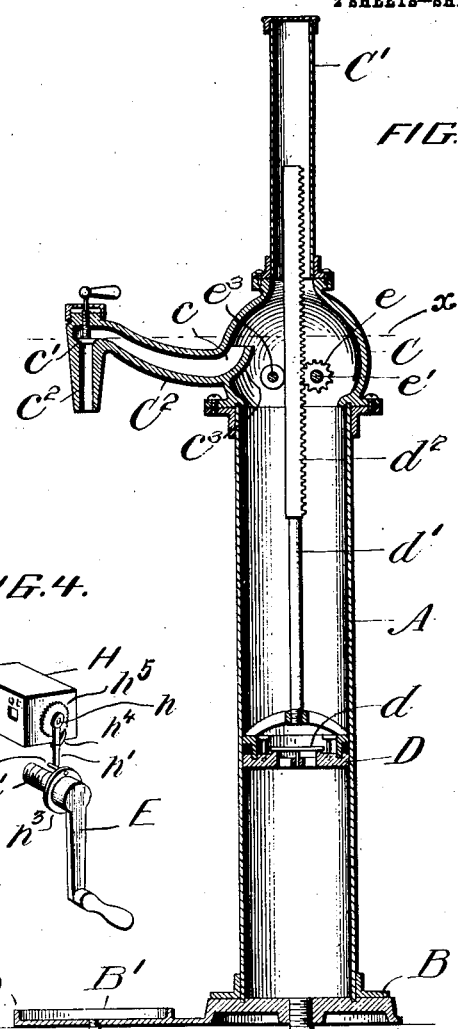
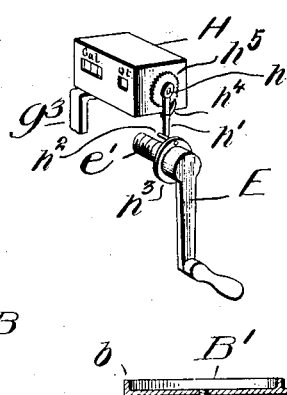
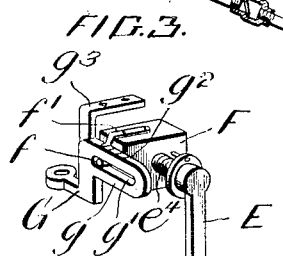
WITNESSES
INVENTOR
William B. Haines
BY
Attorneys

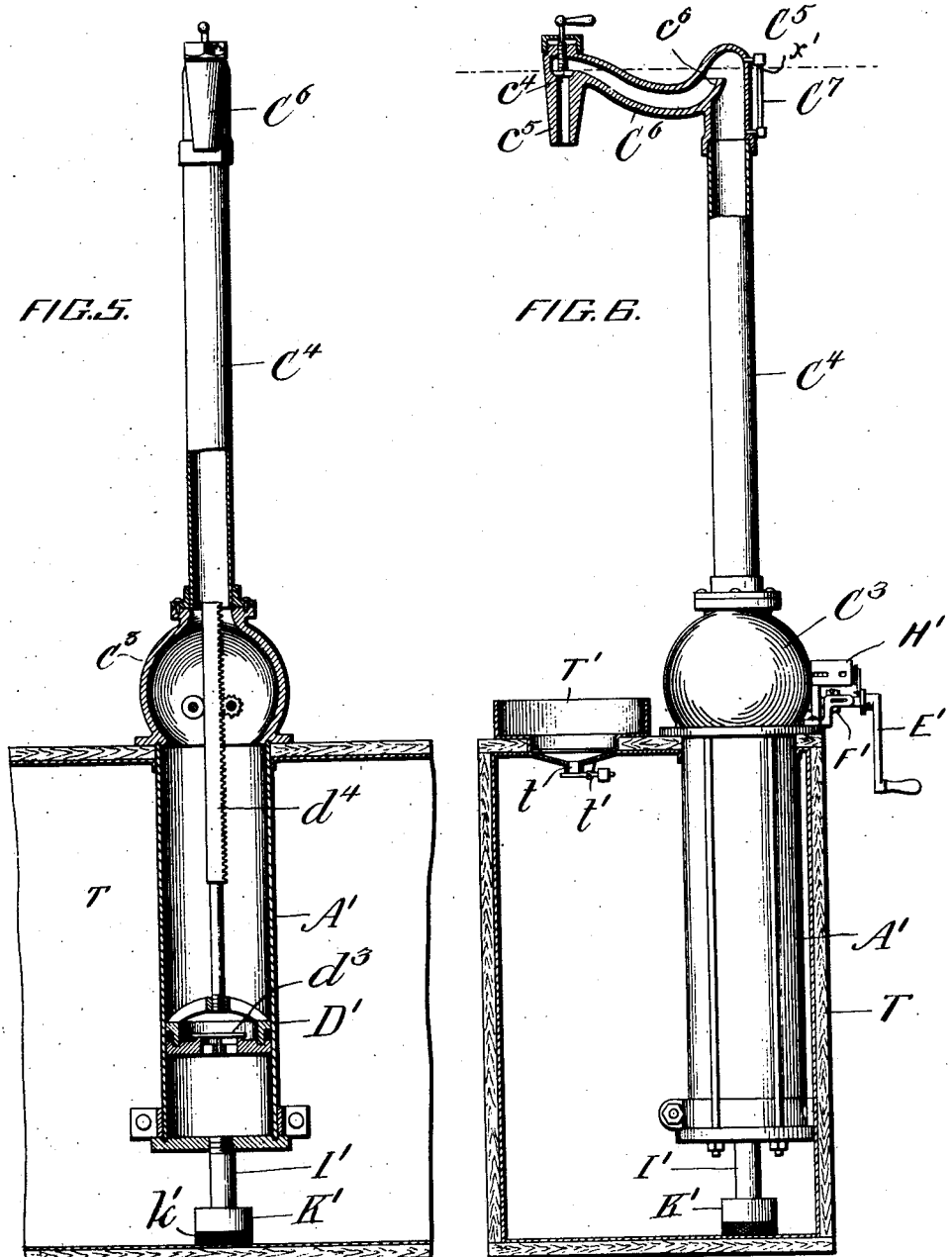

UNITED STATES PATENT OFFICE.

WILLIAM B. HAINES, OF SUNBURY, PENNSYLVANIA, ASSIGNOR TO HAINES OIL MEASURING PUMP COMPANY, OF HARRISBURG, PENNSYLVANIA.

MEASURING-PUMP.

958,919.  Specification of Letters Patent.  Patented May 24, 1910.

Application filed June 9, 1908. Serial No. 437,568.

*To all whom it may concern:*

Be it known that I, WILLIAM B. HAINES, citizen of the United States, residing at Sunbury, in the county of Northumberland and State of Pennsylavnia, have invented certain new and useful Improvements in Measuring-Pumps; and I do hereby declare the following to be a full, clear, and exact description of the invention, such as will enable others skilled in the art to which it appertains to make and use the same.

My invention consists in the novel features hereinafter described reference being had to. the accompanying drawing which illustrates one form in which I have embodied my invention and a slight modification thereof, and said invention is fully disclosed in the following description and claims.

Referring to the drawings, Figure 1 represents a front elevation of a measuring pump embodying my invention. Fig. 2 is a vertical sectional view of the same. Figs. 3 and 4 are detail views of parts of the mechanism. Fig. 5 is a front elevation partly in section showing my invention embodied in a floor tank pump. Fig. 6 is a side view of the same partly in section.

The object of my invention is to provide a measuring pump for delivering measured quantities of liquids particularly such as gasolene, kerosene and the like.

In carrying out my invention I employ a pump cylinder and piston or plunger, the latter being operated by the rotation of a shaft carrying a pinion gearing with a rack on the pump rod, which is entirely inclosed within the pump cylinder or an extension of the same, so that no evaporation of the liquid or escape of fumes is permitted. This is particuarly desirable in handling gasolene, the fumes of which mixed with air form, as is well known, a highly explosive and dangerous mixture. The pinion and rack teeth are preferably so proportioned that each revolution of the pinion moves the plunger to deliver a definite quantity of liquid, say one quart, the capacity of the cylinder being a multiple of this quantity, say one gallon, and the rack providing for four revolutions of the crank shaft to move the plunger from its lowest to its highest position. I also provide a dripless siphon delivery spout, and in connection therewith a sight gage to show the level of the liquid above the plunger; also indicating mechanism to enable the operator to determine the exact position of the plunger at all times, and also mechism for indicating and registering the quantity delivered, all as hereinafter more fully described.

In Figs. 1 and 2 I have shown my invention applied to a type of measuring device adapted for use especially with a storage receptacle, barrel or tank located in another apartment and below the room in which the pump is placed, as in the cellar of a building, or a tank set in the ground outside of the building as the case may be. In these figures A represents the pump barrel or cylinder provided with a base B, and a substantially spherical head C. D is the piston or plunger located in the cylinder and provided with the valve $d$ and a piston or pump rod $d'$ having a rack $d^2$ thereon. The rack engages a pinion $e$ on a shaft $e'$ journaled in the head C and provided at one side thereof with a gland $e^2$ through which it projects, and the projecting portion of the shaft $e'$ is provided with a crank or handle E at its end, for operating the shaft $e'$ by hand. Within the head C, an idle roller $e^3$ is preferably supported on the side of the rack opposite the pinion $e$, to hold the rack in engagement with the pinion and guide it in its vertical movements.

The pinion contains one fourth as many teeth as the rack and in order to provide an indicating mechanism to show the position of the piston at all times I conveniently employ the device shown, which is best illustrated in Fig. 3. The shaft $e'$ outside the head C is provided with a threaded portion $e^4$ engaging a nut F. G is a bracket secured to the casting forming the head C, and having a horizontally slotted guiding portion $g$, the slot $g'$ of which is engaged by a pin $f$ projecting from the adjacent side of the nut F, to keep the nut from turning. The pin $f$ is not essential as the engagement of the side face of the nut with the arm $g$ of the bracket may be relied upon to prevent the turning of the nut. The nut F carries a pointer $f'$ which moves over a scale $g^2$ on the arm $g$, provided with indications, preferably four in number. As the shaft $e'$ is rotated the nut will move inwardly or outwardly, at each rotation of the shaft carrying the pointer from one indication to the next, and thus indicating the position of the piston or plunger in respect to the pump barrel. It also indicates the delivery of one quart (or other unit of measure according to the dimensions of the cylinder) each time the pointer moves outwardly from one indication on the scale to the next. I also provide a registering and indicating device H of well known character provided with rotatable number wheels and having devices for showing the number of gallons and also the number of quarts as they are delivered. The indicating wheel for the quarts will show in succession the numbers 1, 2, 3 and 4 and then 1, etc., and the numbering mechanism for gallons will be advanced one unit each time the quart indicating device shows 4, as will be readily understood. The particular construction of this registering device H is well understood and forms no part of my invention. The shaft $h$, which actuates the numbering mechanism is preferably provided with a loosely mounted operating arm $h'$ depending into the path of a pin $h^2$ on a disk $h^3$ secured to the shaft $e'$, and the arm $h'$ is provided with a ratchet wheel $h^5$ fast on shaft $h$ and engaged by a pawl $h^4$ when the lever is moved by the pin $h^2$ in one direction only, to wit, when the shaft $e'$ is rotated in a direction to deliver liquid from the pump. The register H is conveniently mounted on an arm $g^3$ of the bracket G, as shown in Figs. 3 and 4.

The base B has an aperture in it into which is screwed the supply pipe I, which extends into the supply tank, barrel or receptacle, wherever located, and is provided at its lower end with the check valve K and sieve or filter $k$. I prefer to provide the base B with an extension B' having an annular flange $b$, and forming a drip pan to catch any overflow, when filling vessels with the device. The drip pan is provided with a central aperture through which the liquid drains, and from which it is conducted by a drain passage or pipe L to the storage or supply receptacle. The pipe or passage L is preferably provided with a check valve $l$ to prevent the escape of fumes from the storage or supply receptacle.

The upper end of the pump cylinder or barrel is provided with a closed tubular extension C' secured to the head C to permit the rack to move upwardly as required, and which also serves as an air chamber. The device is also provided with a delivery spout of peculiar form. In Figs 1 and 2 I have shown this spout formed integral with and connected to the head C, which brings the nozzle of the spout at a convenient height from the drip pan B' for filling vessels. The delivery spout $C^2$ extends outwardly and upwardly from an aperture $c$ in the head C, and adjacent to its highest point is provided with a cut off valve $c'$, below which extends a discharge or nozzle $c^2$. A curved lip $c^3$ extends upwardly from the lower edge of the discharge orifice $c$ within the head, to a point slightly below the level of the seat of valve $c'$, as indicated in Fig. 2, in which a dotted line $x$ shows the level of the valve seat, and as the nozzle $c^2$ extends considerably below this level the spout acts as a siphon when the valve is open and will continue to discharge liquid after the pump piston has ceased to work, just long enough to lower the liquid level in head C to the upper edge of the lip, and to empty the spout, hence there will be no drip after the operation of the device is stopped. The valve $c'$ serves the function of hermetically sealing the pump and preventing either the escape of fumes or the ingress of air.

In order that the operator may know the exact level of the liquid in the pump before beginning to operate it, I provide a sight gage $C^5$, of usual type which is secured to the apparatus in line horizontally with the delivery orifice, and will preferably be provided with a mark $x^2$ in line with the seat of valve $c'$. Should the liquid in the cylinder for any reason fall below the level indicated by the mark $x^2$ owing to leakage of the piston or valves, the operator will first operate the plunger to bring the liquid to this level, and during such operation the actuating arm of the register may be held out of operative relation with the register.

The operation of the device will be clear from the drawings and foregoing description and need not be specifically described.

In Figs. 5 and 6 I have shown a slight modification of my apparatus for use where the tank or receptacle is located in the same room as the pump. In these figures T represents the storage tank which serves as a support for the pump. The top of the tank is provided with the drip pan T" which discharges within the tank by a spout or passage $t$, which is provided with a valve $t'$, in this instance a pivoted weighted valve, which is normally closed to prevent the escape of fumes but which can open to admit any liquid caught in the drip pan.

A' represents the pump barrel which is located within the tank T and provided at its bottom end with a short pipe I', a valve K' and strainer $k'$.

$C^3$ represents the head of the pump, which is located outside the tank, and is provided with the operating shaft, handle, indicating and registering devices F', H' exactly as shown in the other figures.

The piston D' is provided with the valve $d^3$, rack $d^4$ and is otherwise the same in construction and operation as the corresponding parts in the other figures, it being understood that the relation of the diameter of the cylinder and the rack and pinion for operating the piston is such that each revolution of the shaft and pinion will deliver a quart (or other unit) of liquid, and that the rack permits a multiple of said units (as four quarts i. e. one gallon) to be delivered by the full stroke of the piston. In this instance I provide a stand pipe $C^4$ extending above the head $C^3$ and cylinder, to support the spout $C^6$, at the desired distance above the drip pan to permit the filling of suitable vessels. The stand pipe $C^4$ carries at its upper end, a casting, or auxiliary head $C^5$ which is preferably formed integrally with the spout $C^6$. The spout $C^6$ is formed substantially as previously described with reference to Figs. 1 and 2, and is provided with a valve $c^4$, nozzle $c^5$ and a lip $c^6$ extending within the auxiliary head $C^5$ so that the device will act as a siphon. The dotted line $x'$ shows the level of the seat of the valve $c^4$, which is above the level of the lip $c^6$. The auxiliary head $C^5$ is also provided with a sight gage $C^7$, having a mark to show the level of the seat of valve $c^4$. The stand pipe $C^4$ affords space within it for the movement of the rack on the piston rod as will be readily seen, and the entire device is hermetically closed when the cut off valve $c^4$ is screwed home.

The features of the apparatus herein shown and described which relate to the pump proper, are not claimed herein as they form the subject of a divisional application filed March 19, 1909, Serial No. 484,498.

What I claim and desire to secure by Letters Patent is:—

1. In a liquid measuring device, the combination with the cylinder, the piston, a rack bar connected therewith, said cylinder having an extension closed at its upper end and inclosing said rack bar, a pinion for operating the rack bar, and a shaft for said pinion extending to the exterior of the apparatus, said shaft having a threaded portion thereon outside of the apparatus, a traveling nut on said shaft, a pointer carried thereby, and a stationary part adjacent to the said pointer provided with indications, substantially as described.

2. In a liquid measuring device, the combination with the cylinder, the piston, a rack bar connected therewith, said cylinder having an extension closed at its upper end and inclosing said rack bar, a pinion for operating the rack bar, and a shaft for said pinion extending to the exterior of the apparatus, said shaft having a threaded portion thereon outside of the apparatus, a traveling nut on said threaded portion, a stationary bracket provided with a slot parallel to said shaft, a stud on said nut engaging said slot, said bracket and nut being provided the one with indications and the other with a pointer adapted to coöperate therewith, substatially as described.

3. In a liquid measuring device, the combination with the measuring cylinder provided at its upper end with a discharge spout, means for hermetically sealing said cylinder and said spout, a piston in said cylinder provided with a liquid passage therethrough, a check valve controlling said passage, means for reciprocating the piston and having an operating part extending to the outside of the cylinder, an indicating device for showing the position of the piston vertically in the cylinder, and a sight gage located in horizontal alinement with the communication between the spout and said cylinder.

4. In a measuring device, the combination with the cylinder and piston, a rack bar connected with the piston, a pinion for operating said rack bar, a shaft for said pinion extending outside of the apparatus, and provided with operating means, a closed extension above the cylinder for accommodating the upward movement of the rack bar, a device for indicating the position of the piston in the cylinder, operatively connected with the said shaft, a registering device operatively connected with said shaft, a delivery spout communicating with the cylinder, and a valve for closing said spout, substantially as described.

In testimony whereof I affix my signature, in the presence of two witnesses.

WILLIAM B. HAINES.

Witnesses:
CLYDE H. HAINES,
NELLIE R. HAINES.